United States Patent
Fujimoto

(10) Patent No.: US 10,744,823 B2
(45) Date of Patent: Aug. 18, 2020

(54) TIRE

(71) Applicant: Sumitomo Rubber Industries, Ltd., Kobe-shi, Hyogo (JP)

(72) Inventor: Yuki Fujimoto, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 484 days.

(21) Appl. No.: 15/614,168

(22) Filed: Jun. 5, 2017

(65) Prior Publication Data

US 2017/0368885 A1 Dec. 28, 2017

(30) Foreign Application Priority Data

Jun. 27, 2016 (JP) ................................. 2016-127099

(51) Int. Cl.
*B60C 11/03* (2006.01)
*B60C 11/12* (2006.01)

(52) U.S. Cl.
CPC ....... *B60C 11/0311* (2013.01); *B60C 11/0304* (2013.01); *B60C 11/0309* (2013.01); *B60C 11/12* (2013.01); *B60C 11/1236* (2013.01); *B60C 2011/0346* (2013.01); *B60C 2011/0358* (2013.01); *B60C 2011/0365* (2013.01); *B60C 2011/0367* (2013.01); *B60C 2011/0369* (2013.01); *B60C 2011/0372* (2013.01); *B60C 2011/0376* (2013.01)

(58) Field of Classification Search
CPC ... B60C 11/0311; B60C 11/0309; B60C 11/12
See application file for complete search history.

(56) References Cited

U.S. PATENT DOCUMENTS

2013/0306208 A1 11/2013 Kageyama
2014/0014244 A1 1/2014 Takano
2014/0209225 A1* 7/2014 Kuroda ............... B60C 11/0306
152/209.18

(Continued)

FOREIGN PATENT DOCUMENTS

EP 1674293 A2 6/2006
EP 3081393 A1 10/2016
EP 3081397 A1 10/2016

(Continued)

OTHER PUBLICATIONS

Extended European Search Report for European Application No. 17170315.0, dated Nov. 10, 2017.

*Primary Examiner* — Jacob T Minskey
*Assistant Examiner* — Melody Tsui
(74) *Attorney, Agent, or Firm* — Birch, Stewart, Kolasch & Birch, LLP

(57) ABSTRACT

A tire comprises a tread portion having an outboard tread edge To and an inboard tread edge Ti. The tread portion is provided with: an outboard shoulder main groove extending continuously in the tire circumferential direction; an outboard crown main groove extending continuously in the tire circumferential direction and disposed between the outboard shoulder main groove and a tire equator; and outboard lateral grooves extending from the outboard crown main groove to the outboard tread edge To. The groove width of each of the outboard lateral grooves is decreased toward the outboard crown main groove 4.

20 Claims, 8 Drawing Sheets

(56) References Cited

U.S. PATENT DOCUMENTS

2014/0230983 A1* 8/2014 Tagashira ............ B60C 11/1259
152/209.23
2015/0352902 A1* 12/2015 Takei ...................... B60C 11/04
152/209.25

FOREIGN PATENT DOCUMENTS

JP     2013-237360 A      11/2013
WO    WO 2015/098408 A1   7/2015

* cited by examiner

TIRE

TECHNICAL FIELD

The present invention relates to a tire, more particularly to an asymmetrical tread pattern capable of exerting good on-snow performance.

BACKGROUND ART

Japanese Patent Application Publication No. 2013-237360 discloses a pneumatic tire comprising a tread portion provided with outboard lateral grooves extending from the outboard tread edge toward the tire equator in order to improve on-snow performance. The outboard lateral grooves terminate between an outboard shoulder main groove and an outboard crown main groove extending continuously in the tire circumferential direction. Such outboard lateral grooves have room for improvement in on-snow performance of the tire.

SUMMARY OF THE INVENTION

It is therefore, an object of the present invention to provide a tire improved in the on-snow performance.

According to the present invention, a tire comprises:
a tread portion having an outboard tread edge to be positioned away from a center of a vehicle body and an inboard tread edge to be positioned close to the center of the vehicle body, the tread portion provided with an outboard shoulder main groove extending continuously in the tire circumferential direction, an outboard crown main groove extending continuously in the tire circumferential direction and disposed between the outboard shoulder main groove and the tire equator, and a plurality of outboard lateral grooves extending from the outboard crown main groove to the outboard tread edge, wherein the groove width of each of the outboard lateral grooves is decreased toward the outboard crown main groove.

Further, the tire according to the present invention may includes the following features (1)-(7):
(1) each of the outboard lateral grooves comprises an axially outer part between the outboard shoulder main groove and the outboard tread edge, and an axially inner part between the outboard shoulder main groove and the outboard crown main groove, the axially outer part is inclined with respect to the tire axial direction, and the axially inner part is inclined with respect to the tire axial direction to the same direction as the axially outer part;
(2) the difference between an angle of the above-said axially outer part with respect to the tire axial direction and an angle of the above-said axially inner part with respect to the tire axial direction is not more than 15 degrees;
(3) on both sides of the outboard shoulder main groove, the groove edges of the above-said axially outer part are respectively aligned with the groove edges of the above-said axially inner part;
(4) the groove edges of the above-said axially inner part are each extended straight so that the groove width of the axially inner part is decreased continuously from the outboard shoulder main groove to the outboard crown main groove;
(5) the above-said axially inner part comprises an axially outer deep portion and an axially inner shallow portion;
(6) each of the groove edges of the above-said axially outer part comprises a first part extending from the outboard tread edge along the length direction of the axially outer part, and a second part bent from the first part toward the widthwise center line of the above-said axially outer part;
(7) the second parts of the respective groove edges of the above-said axially outer part are formed at different axial positions.

DESCRIPTION OF THE PREFERRED EMBODIMENTS

The present invention can be applied to pneumatic tires as well as non-pneumatic (airless) tires for motor vehicles, e.g. passenger cars, heavy duty vehicles and the like to use in the winter season.

Taking a pneumatic tire for passenger cars as an example, embodiments of the present invention will now be described in detail in conjunction with the accompanying drawings.

Figure 1:
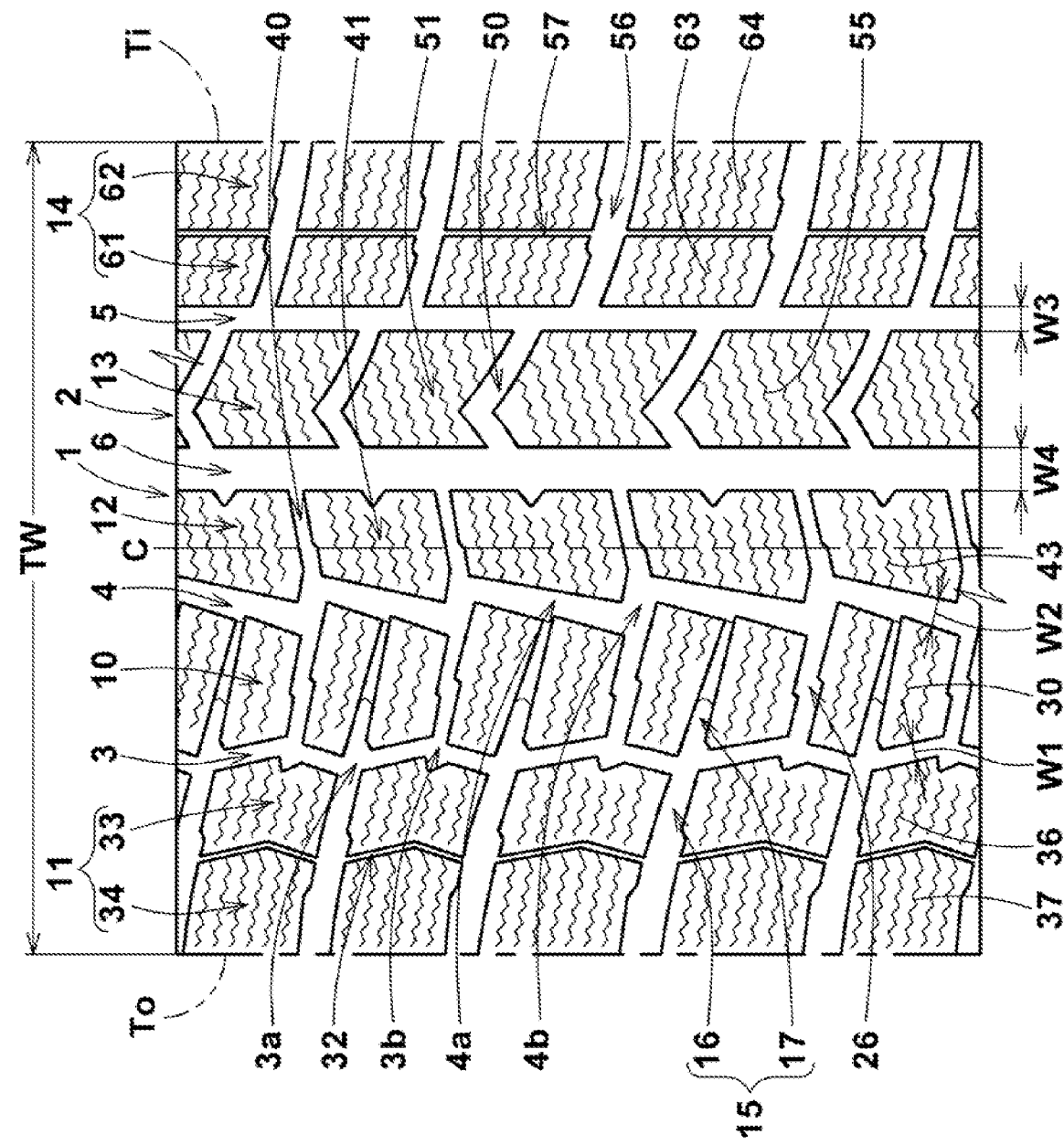
FIG. 1 is a developed partial plan view of a tire as an embodiment of the present invention showing the tread pattern.

FIG. 1 shows a part of the tread portion 2 of a tire 1 as an embodiment of the present invention.

According to the present invention, the tread portion 2 is provided with an asymmetrical tread pattern by which the tire mounting location on the vehicle is specified.

Thus, the tread portion 2 has an outboard tread edge To to be positioned away from the center of the vehicle body, and an inboard tread edge Ti to be positioned close to the center of the vehicle body. For example, a sidewall (not shown) of the tire to be located on outside when installed on the vehicle is provided with an indication representing "outside", and a sidewall to be located on inside is provided with an indication representing "inside".

In the case of a pneumatic tire, the tread edges To and Ti are the axial outermost edges of the ground contacting patch of the tire which occurs under a normally inflated loaded condition when the camber angle of the tire is zero.

The undermentioned tread width TW is the width measured under a normally inflated unloaded condition, as the axial distance between the tread edges determined as above.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

In this application including specification and claims, various dimensions, positions and the like of a pneumatic tire refer to those under the normally inflated unloaded condition of the tire unless otherwise noted.

The term "sipe" means a fine groove whose width is not more than 1.5 mm inclusive of a cut having no substantial width.

In this embodiment, the tread portion 2 is provided with four main grooves extending continuously in the tire circumferential direction which are:
an outboard shoulder main groove 3 disposed between the outboard tread edge To and the tire equator C,
an outboard crown main groove 4 disposed between the outboard shoulder main groove 3 and the tire equator C,
an inboard shoulder main groove 5 disposed between the inboard tread edge Ti and the tire equator C, and
an inboard crown main groove 6 disposed between the inboard shoulder main groove 5 and the tire equator C.
The inboard shoulder main groove 5 is a straight groove.
The inboard crown main groove 6 is a straight groove.
The outboard shoulder main groove 3 is a zigzag groove and has axially outwardly projecting first projecting parts 3a and axially inwardly projecting second projecting parts 3b which alternate in the tire circumferential direction.
The outboard crown main groove 4 is a zigzag groove and made up of long segments 4a and short segments 4b which alternate in the tire circumferential direction, wherein, with respect to the tire circumferential direction, the long segments 4a are inclined to one direction, and the short segments 4b are inclined to one direction opposite to that of the long segments 4a.

The distance in the tire axial direction from the tire equator C to the outboard shoulder main groove 3 and
the distance in the tire axial direction from the tire equator C to the inboard shoulder main groove 5 are preferably set in a range from 0.25 to 0.35 times the tread width TW, for example. The distance in the tire axial direction from the tire equator C to the outboard crown main groove 4 and
the distance in the tire axial direction from the tire equator c to the inboard crown main groove 6 are preferably set in a range from 0.05 to 0.10 times the tread width TW, for example.

It is preferable that the groove width w1 of the outboard shoulder main groove 3 is set to be less than the groove width w2 of the outboard crown main groove 4, the groove width w3 of the inboard shoulder main groove 5, and the groove width w4 of the inboard crown main groove 6 in order to increase the rigidity of the land region on each side of the outboard shoulder main groove 3 so as to improve the steering stability during cornering.

From a similar standpoint, it is preferable that the groove width w3 of the inboard shoulder main groove 5 is less than the groove width w2 of the outboard crown main groove 4 and the groove width w4 of the inboard crown main groove 6.

It is preferable that the groove width w1 of the outboard shoulder main groove 3 and the groove width w3 of the inboard shoulder main groove 5 are set in a range from 1% to 4% of the tread width TW in order to achieve both of the steering stability on dry roads and on-snow performance.

It is preferable that the groove width w2 of the outboard crown main groove 4 and the groove width w4 of the inboard crown main groove 6 are set in a range from 3% to 9% of the tread width TW.

It is preferable that the groove depths of the main grooves 3, 4, 5 and 6 are set in a range from 5 to 15 mm in the case of a passenger car tire.

The tread portion 2 is axially divided by the above-mentioned main grooves into:
an outboard shoulder land region 11 between the outboard tread edge To and the outboard shoulder main groove 3,
an outboard middle land region 10 between the outboard shoulder main groove 3 and the outboard crown main groove 4,
a crown land region 12 between the outboard crown main groove 4 and the inboard crown main groove 6,
an inboard middle land region 13 between the inboard crown main groove 6 and the inboard shoulder main groove 5, and
an inboard shoulder land region 14 between the inboard shoulder main groove 5 and the inboard tread edge Ti.

Figure 2:
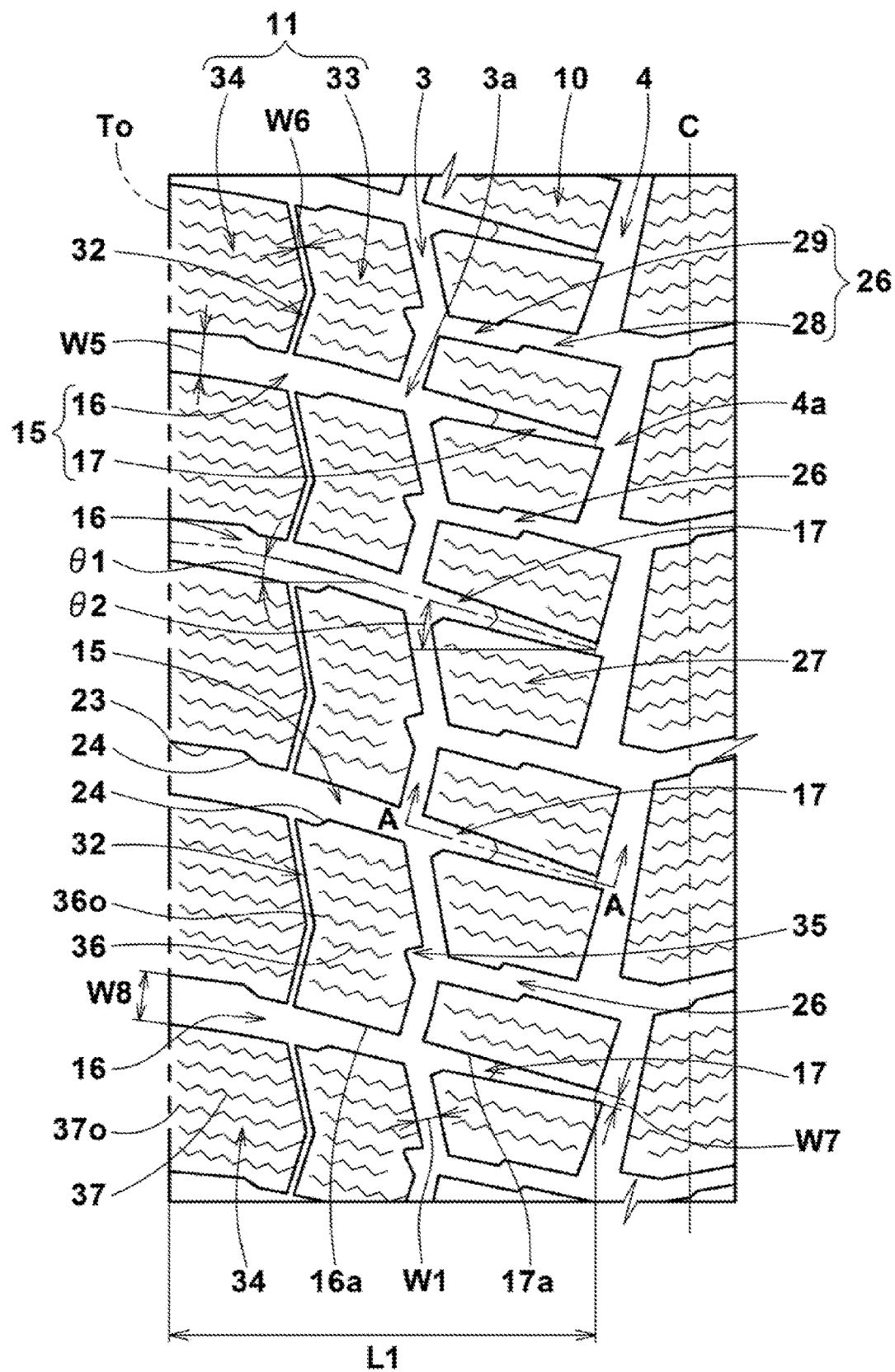
FIG. 2 is a closeup of FIG. 1 showing the outboard middle land region and the outboard shoulder land region.

Further, the tread portion 2 is provided with a plurality of outboard lateral grooves 15 extending from the outboard crown main groove 4 to the outboard tread edge To as shown in FIG. 2. Thus, during running on snowy roads, each of the outboard lateral grooves 15 forms an axially long continuous snow block to improve the snow traction performance.

It is preferable that the outboard lateral grooves 15 extend across the respective first projecting parts 3a of the outboard shoulder main groove 3.
when the outboard shoulder main groove 3 is deflected in the ti re circumferential direction, such outboard lateral grooves 15 promote ejection of the snow in the grooves toward the axially outside and can prevent the grooves from being clogged with the compressed snow.

It is preferable that the outboard lateral grooves 15 are connected to the respective long segments 4a of the outboard crown main groove 4. Such outboard lateral grooves 15 can prevent the long segments 4a from being clogged with the compressed snow.

The groove width w5 of each of the outboard lateral grooves 15 is decreased toward the outboard crown main groove 4. Thus, during cornering on snowy roads, the snow in the outboard lateral groove 15 is compressed toward the axially inner end of the groove 15 from the outboard tread edge To side, and it is possible to form a hard snow block. Therefore, a large shearing force can be obtained from the snow block, and grip performance during cornering on snowy roads can be improved.

Although the outboard lateral grooves 15 are relatively long, as the groove width is decreased toward the outboard crown main groove 4, the pattern rigidity of the tread portion 2 is prevented from being decreased to a larger degree, and the steering stability on dry roads can be prevented from deteriorating.

It is preferable that the axial length L1 of the outboard lateral grooves 15 is set in a range from 0.35 to 0.45 times the tread width TW in order to achieve both of the on-snow performance and steering stability on dry roads.

It is preferable that the groove width w5 of the outboard lateral grooves is set in a range from 0.3 to 2.0 times the groove width w1 of the outboard shoulder main groove 3.

It is preferable that the ratio w7/w8 of the minimum groove width w7 and maximum groove width w8 of the outboard lateral grooves 15 is set in a range from 0.10 to 0.50.

Each of the outboard lateral grooves 15 comprises an axially outer part 16 between the outboard tread edge To and the outboard shoulder main groove 3, and
an axially inner part 17 between the outboard shoulder main groove 3 and the outboard crown main groove 4.
It is preferable that the axially outer part 16 and the axially inner part 17 are inclined to the same direction with respect to the tire axial direction.
Thereby, during running on snowy roads, the snow block formed in the axially outer part 16 and the axially inner part 17 is easy to be discharged, and the snow traction performance can be improved.

It is preferable that the angle θ1 of the axially outer part 16 with respect to the tire axial direction and
the angle θ2 of the axially inner part 17 with respect to the tire axial direction are set in a range from 5 to 25 degrees. The difference between the angle θ1 and the angle θ2 is preferably not more than 15 degrees, more preferably not more than 10 degrees. Such outboard lateral groove 15 can form a long continuous substantially-straight snow block to provide high snow traction performance.

In order to effectively derive the above-mentioned advantageous effect, it is preferred that the groove edges 16a of the axially outer part 16 are aligned with the respective groove edges 17a of the axially inner part 17 through the outboard shoulder main groove 3, and the respective edge 16a and the edge 17a on the same side are in a straight line.

It is preferable that each of the groove edges 17a of the axially inner part 17 extends straight so that the groove width in the axially inner part 17 decreases continuously from the outboard shoulder main groove 3 to the outboard crown main groove 4. Such axially inner parts 17 smoothly change the pattern rigidity of the outboard middle land region 10 and help to suppress uneven wear.

Figure 3:
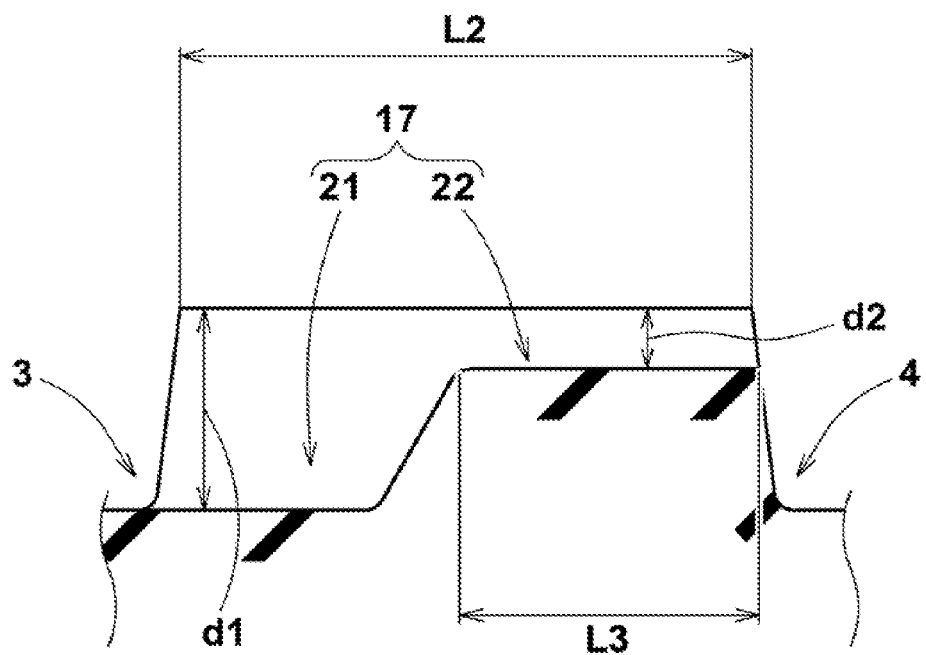
FIG. 3 is a cross sectional view taken along line A-A of FIG. 2.

It is preferable that, as shown in FIG. 3, the axially inner part 17 in this embodiment comprises a deep portion 21 on the outboard shoulder main groove 3 side, and a shallow portion 22 on the outboard crown main groove 4 side.
such axially inner parts 17 help to suppress the lowering of the pattern rigidity of the tread portion 2.
In order to improve the steering stability on dry roads and on-snow performance in a good balance, the groove depth d2 of the shallow portion 22 is preferably set in a range from 0.15 to 0.30 times the groove depth d1 of the deep portion 21.
The axial length L3 of the shallow portion 22 is preferably set in a range from 0.40 to 0.60 times the axial length L2 of the axially inner part 17.

The groove width of the axially outer part 16 is gradually decreased from the outboard tread edge To toward the outboard crown main groove 4 in a stepped manner as shown in FIG. 2.

In this embodiment, each groove edge of the axially outer part 16 comprises a first part 23 extending in the length direction of the axially outer part 16 from the outboard tread edge To, and a second part 24 bent from the first part 23 toward the widthwise center line of the axially outer part 16. During running on dry roads, such axially outer parts 16 generate pumping sound in a different frequency band than the above-mentioned axially inner parts 17, and help to turn the pumping sound caused by the outboard lateral grooves 15 to white noise.

It is preferable that, in each of the axially outer parts 16, the second part 24 of one of the groove edges and the second part 24 of the other groove edge are formed in different axial positions. Thereby, the progress of wear occurring around the groove edges of the axially outer part 16 can be uniformed.

The outboard middle land region 10 is provided with outboard middle lateral grooves 26 each positioned between every two of the circumferentially adjacent axially inner parts 17 of the outboard lateral grooves 15. Thereby, the outboard middle land region 10 is divided into outboard middle blocks 27 between the axially inner parts 17 and the outboard middle lateral grooves 26.

The outboard middle lateral grooves 26 extend form the respective second projecting parts 3b of the outboard shoulder main groove 3 to the respective short segments 4b of the outboard crown main groove 4.
The outboard middle lateral grooves 26 are inclined in the same direction as the axially inner parts 17.

It is preferable that each of the outboard middle lateral grooves 26 in this embodiment is bent in a stepped manner. Specifically, the outboard middle lateral groove 26 comprises a first groove part 28 connected to the outboard crown main groove 4 and a second groove part 29 connected to the outboard shoulder main groove 3 which parts are shifted in the tire circumferential direction to have a crank shape. During running on snowy roads, such outboard middle lateral groove 26 can provide a frictional force in the tire axial direction.

Figure 4:
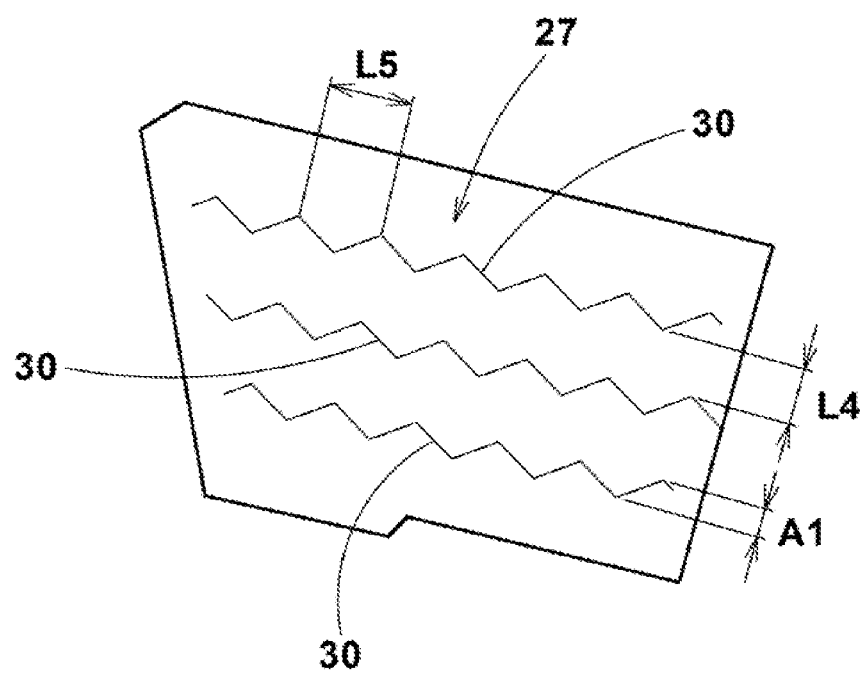
FIG. 4 is a top view of an outboard middle block shown in FIG. 2.

As shown in FIG. 4, the outboard middle blocks 27 each have an axially long shape in which its axial dimension is larger than its circumferential dimension. However, the outboard middle blocks 27 are not limited to such shape.

Each of the outboard middle blocks 27 is provided with a plurality of outboard middle sipes 30 extending zigzag in the tire axial direction.
During running on icy roads, the edges of the outboard middle sipes 30 scratch the road surface and can provide larger traction. Further, when the block contacts with the ground, the outboard middle sipes 30 are closed, and the apparent rigidity of the block is increased. Thus, the steering stability on dry roads can be improved.

It is preferable that the shortest distance L4 between the outboard middle sipes 30 is set in a range from 2.0 to 4.5 mm in order to provide a sufficient number of the sipes while securing the rigidity of the block.
From a similar standpoint, it is preferable that the wavelength L5 of zigzag wave of the outboard middle sipe 30 is set in a range from 2.0 to 3.5 mm. Further, it is preferable that the peak-to-peak amplitude A1 of the outboard middle sipe 30 is set in a range from 0.80 to 1.20 mm.
These ranges of the distance L4, wavelength L5 and peak-to-peak amplitude A1 can be applied to the sipes described hereinafter.

The outboard shoulder land region 11 is provided with an outboard shoulder narrow groove 32 connecting between every two of the circumferentially adjacent axially outer parts 16 of the outboard lateral grooves 15 as shown in FIG. 2.
Thereby, the outboard shoulder land region 11 is subdivided into a plurality of first outboard shoulder blocks 33 each defined by the outboard shoulder narrow groove 32, the outboard shoulder main groove 3 and the circumferentially adjacent axially outer parts 16, and
a plurality of second outboard shoulder blocks 34 each defined by the outboard shoulder narrow groove 32, the outboard tread edge To, and the circumferentially adjacent axially outer parts 16.

It is preferable that the outboard shoulder narrow grooves 32 are bent in the same manner as the zigzag of the outboard shoulder main groove 3.

It is preferable that the groove width w6 of the outboard shoulder narrow groove 32 is set in a range from 0.15 to 0.35 times the groove width w1 of the outboard shoulder main groove 3.

It is preferable that the first outboard shoulder block 33 has a circumferentially long shape in which its axial dimension is less than its circumferential dimension.

In this embodiment, the outboard middle blocks 27 having the axially long shapes and the first outboard shoulder blocks 33 having the circumferentially long shape are adjacently arranged in order to utilize their deformations occurring in different directions when contacting with the ground for preventing the adjacent grooves from being clogged with the compressed snow.

The axially inner side surface of each of the first outboard shoulder blocks 33 is provided with a concave portion 35.

Each of the first outboard shoulder blocks 33 is provided with a plurality of first outboard shoulder sipes 36 extending zigzag in the tire axial direction.

It is preferable that the concave portions 35 are disposed axially outside the axially outer open ends of the respective outboard middle lateral grooves 26.

During running on snowy roads, such concave portions 35 help to form large snow blocks in cooperation with the outboard middle lateral groove 26.

The axially outer ends 36o of the first outboard shoulder sipes 36 in this embodiment are terminated within the first outboard shoulder block 33. Thereby, the rigidity of the first outboard shoulder block 33 is maintained in an axially outer part thereof and the steering stability on dry roads can be maintained.

The second outboard shoulder blocks 34 are each provided with a plurality of second outboard shoulder sipes 37 extending zigzag in the tire axial direction.

The axially outer ends 37o of the second outboard shoulder sipes 37 in this embodiment are terminated within the second outboard shoulder block 34. Thereby, the rigidity of the second outboard shoulder block 34 is maintained in an axially outer part thereof.

Figure 5:
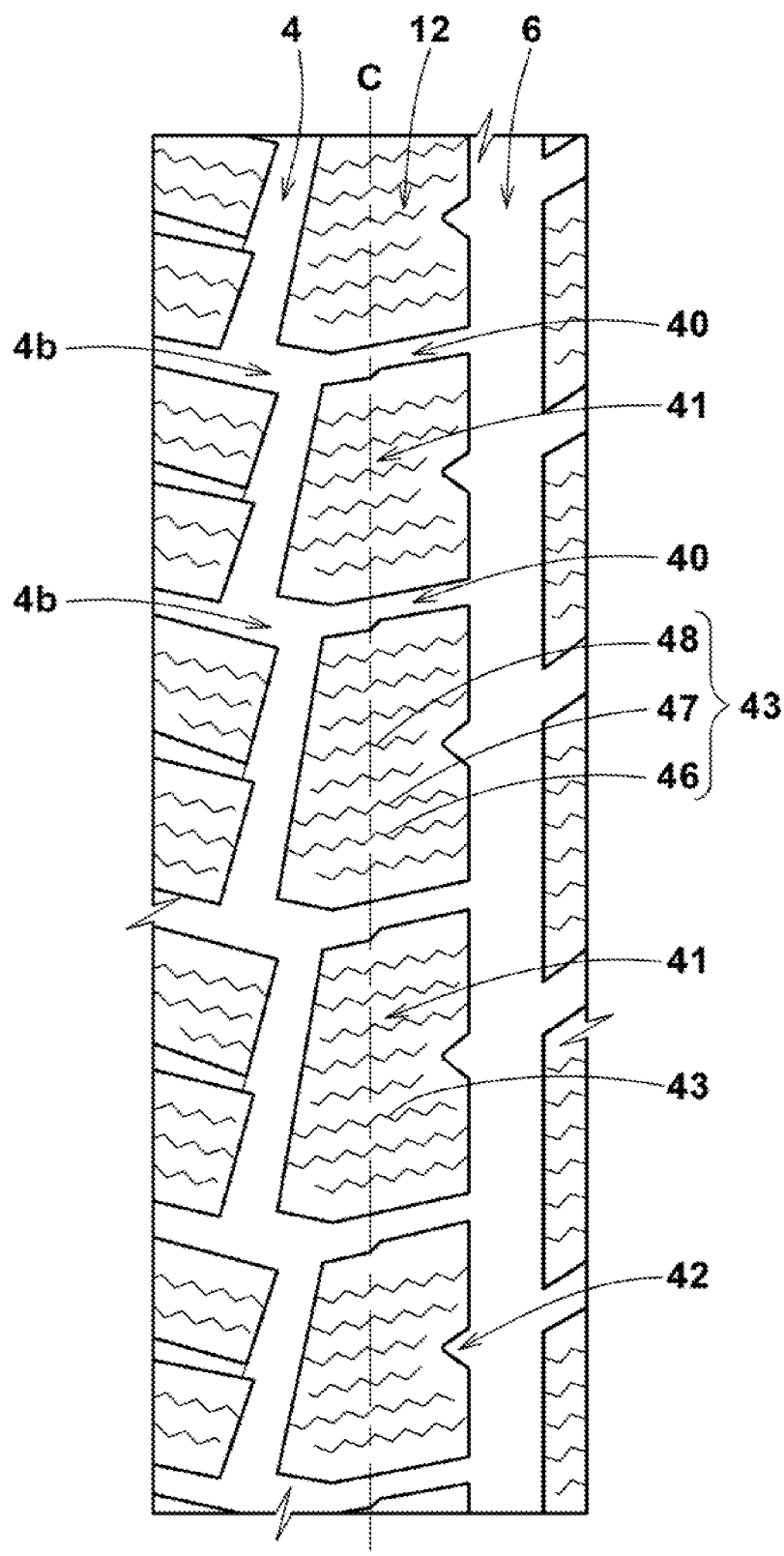
FIG. 5 is a closeup of FIG. 1 showing the crown land region.

It is preferable that the crown land region 12 comprises crown blocks 41 circumferentially divided by a plurality of crown lateral grooves 40 extending from the outboard crown main groove 4 to the inboard crown main groove 6 as shown in FIG. 5. It is preferable that the crown lateral grooves 40 in this embodiment are inclined with respect to the tire axial direction oppositely to the outboard lateral grooves 15.

It is preferable that the crown lateral grooves 40 are connected to the respective short segments 4b of the outboard crown main groove 4.

It is preferable that the groove width of each of the crown lateral grooves 40 is gradually increased from the inboard crown main groove 6 toward the outboard crown main groove 4.

The crown blocks 41 in this embodiment each have a circumferentially long shape in which its axial dimension is less than its circumferential dimension.

Such crown block 41 has high rigidity in the tire circumferential direction and helps to improve traction on dry roads.

The side surface on the inboard tread edge Ti side of each of the crown blocks 41 is provided with a concave portion 42. The crown blocks 41 are each provided with a plurality of crown sipes 43 extending zigzag in the tire axial direction.

The crown sipes 43 include a first crown sipe 46 extending across the crown block 41, a second crown sipe 47 extending from the outboard crown main groove 4 toward the inboard crown main groove 5 and terminated within the block, and a third crown sipe 48 extending from the inboard crown main groove 6 toward the outboard crown main groove 4 and terminated within the block. Thereby, during running on icy roads, the crown block 41 can be appropriately deformed so that the edges of the sipes effectively contact with the ground.

Figure 6:
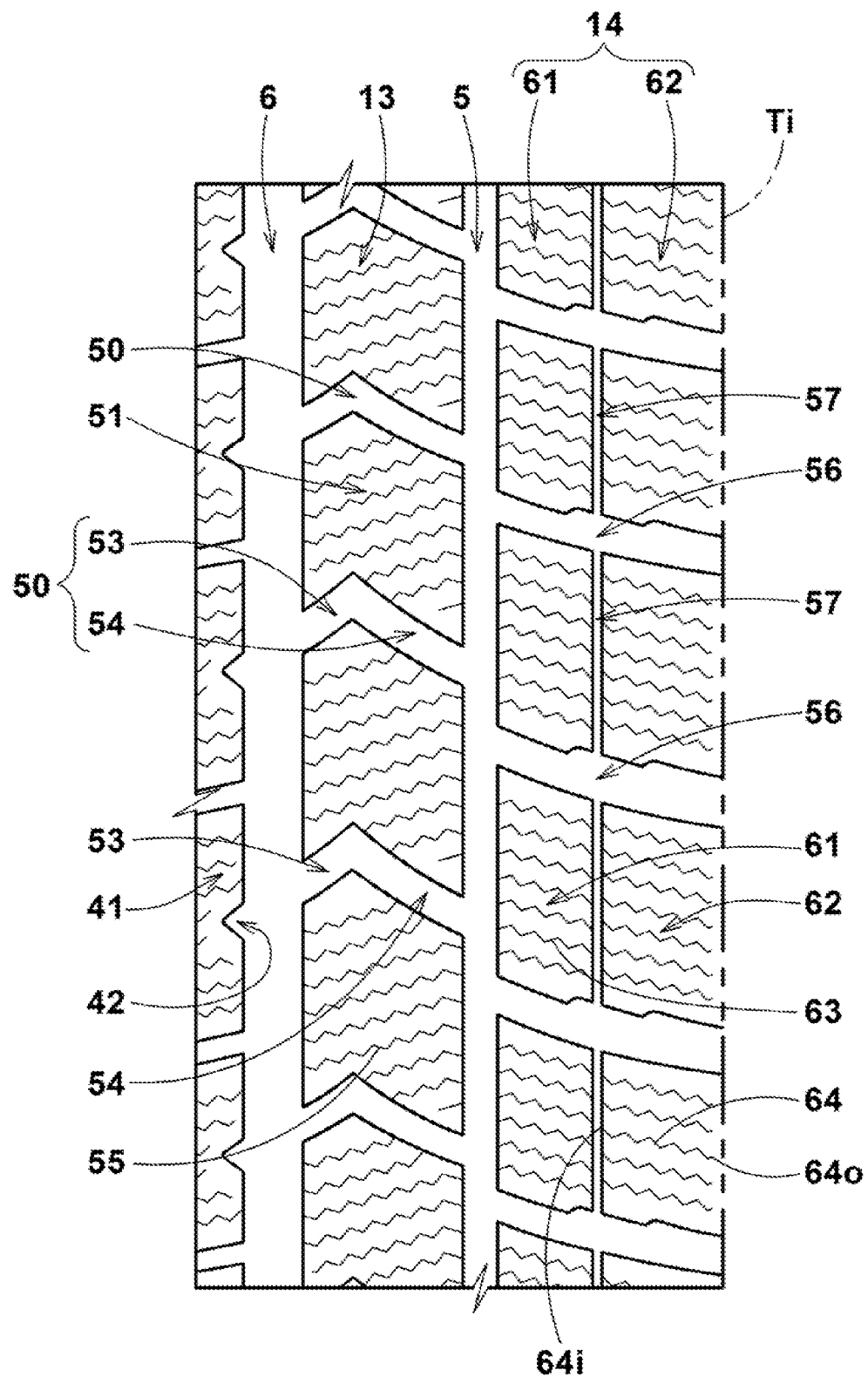
FIG. 6 is a closeup of FIG. 1 showing the inboard middle land region and the inboard shoulder land region.

It is preferable that the inboard middle land region 13 comprises a plurality of inboard middle blocks 51 circumferentially divided by a plurality of inboard middle lateral grooves 50 extending in the tire axial direction from the inboard crown main groove 6 to the inboard shoulder main groove 5 as shown in FIG. 6.

It is preferable that each of the inboard middle lateral grooves 50 comprises a first groove part 53 connected to the inboard crown main groove 6 and inclined with respect to the tire axial direction, and a second groove part 54 connected to the inboard shoulder main groove 5 and inclined with respect to the tire axial direction oppositely to the first groove part 53. Such inboard middle lateral groove 50 can provide a frictional force in the tire axial direction during running on snowy roads.

In this embodiment, the concave portion 42 of each of the crown blocks 41 is located in the front of one of the first groove parts 53 in a direction of the first part 53 extending from its axially outer end to its axially inner end. Thereby, during running on snowy roads, a large snow block can be formed in the concave portion 42, the inboard middle lateral groove 50 and the inboard crown main groove 6.

It is preferable that the inboard middle blocks 51 are each provided with a plurality of inboard middle sipes 55 extending zigzag in the tire axial direction.

In this embodiment, It is preferable that at least 50% in the number of the inboard middle sipes 55 of each of inboard middle blocks 51 extend across the entire width of the inboard middle block 51 in order to improve the traction performance during running on icy roads.

The inboard shoulder land region 14 is provided with a plurality of inboard shoulder lateral grooves 56 and a plurality of inboard shoulder narrow grooves 57.

The inboard shoulder lateral grooves 56 extend from the inboard shoulder main groove 5 to the inboard tread edge Ti. The inboard shoulder lateral grooves 56 are inclined to the same direction as the second groove parts 54 of the inboard middle lateral grooves 50.

It is preferable that the groove width of each of the inboard shoulder lateral grooves 56 is gradually decreased from the inboard tread edge Ti toward the inboard shoulder main groove 5 in a stepped manner.

In each of the inboard shoulder lateral grooves 56 in this embodiment, one of the groove edges extends smoothly along the length direction of the groove whereas the other groove edge extends zigzag to have portions bent toward the widthwise center line of the groove in the course from the axially outside to the axially inside.

The inboard shoulder narrow grooves 57 in this embodiment extend straight in the tire circumferential direction to connect between the circumferentially adjacent inboard shoulder lateral grooves 56.

The inboard shoulder land region 14 is divided by the inboard shoulder lateral grooves 56 and the inboard shoulder narrow grooves 57 into first inboard shoulder blocks 61 each defined by the inboard shoulder narrow groove 57, the inboard shoulder main groove 5 and the circumferentially adjacent inboard shoulder lateral grooves 56, and second inboard shoulder blocks 62 each defined by the inboard shoulder narrow groove 57, the inboard tread edge Ti and the circumferentially adjacent inboard shoulder lateral grooves 56.

The first inboard shoulder blocks 61 each have a circumferentially long shape in which its circumferential dimension is larger than its axial dimension.

The second inboard shoulder blocks 62 each have a circumferentially long shape in which its circumferential dimension is larger than its axial dimension.

It is preferable that each of the first inboard shoulder blocks 61 is provided with a plurality of first inboard shoulder sipes 63 extending zigzag in the tire axial direction. In this embodiment, each of the first inboard shoulder sipes 63 extends across the entire width of the block in order to effectively increase the traction during running on icy roads.

It is preferable that each of the second inboard shoulder blocks 62 is provided with a plurality of second inboard shoulder sipes 64 extending zigzag in the tire axial direction. In this embodiment, each of the second inboard shoulder sipes 64 has an axially inner end 64i connected with the inboard shoulder narrow groove 57 and an axially outer end 64o terminated within the block in order to maintain the rigidity of the second inboard shoulder block 62 to improve the steering stability on dry roads.

While detailed description has been made of an especially preferable embodiment of the present invention, the present invention can be embodied in various forms without being limited to the illustrated embodiment.

Comparison Tests

Figure 7:
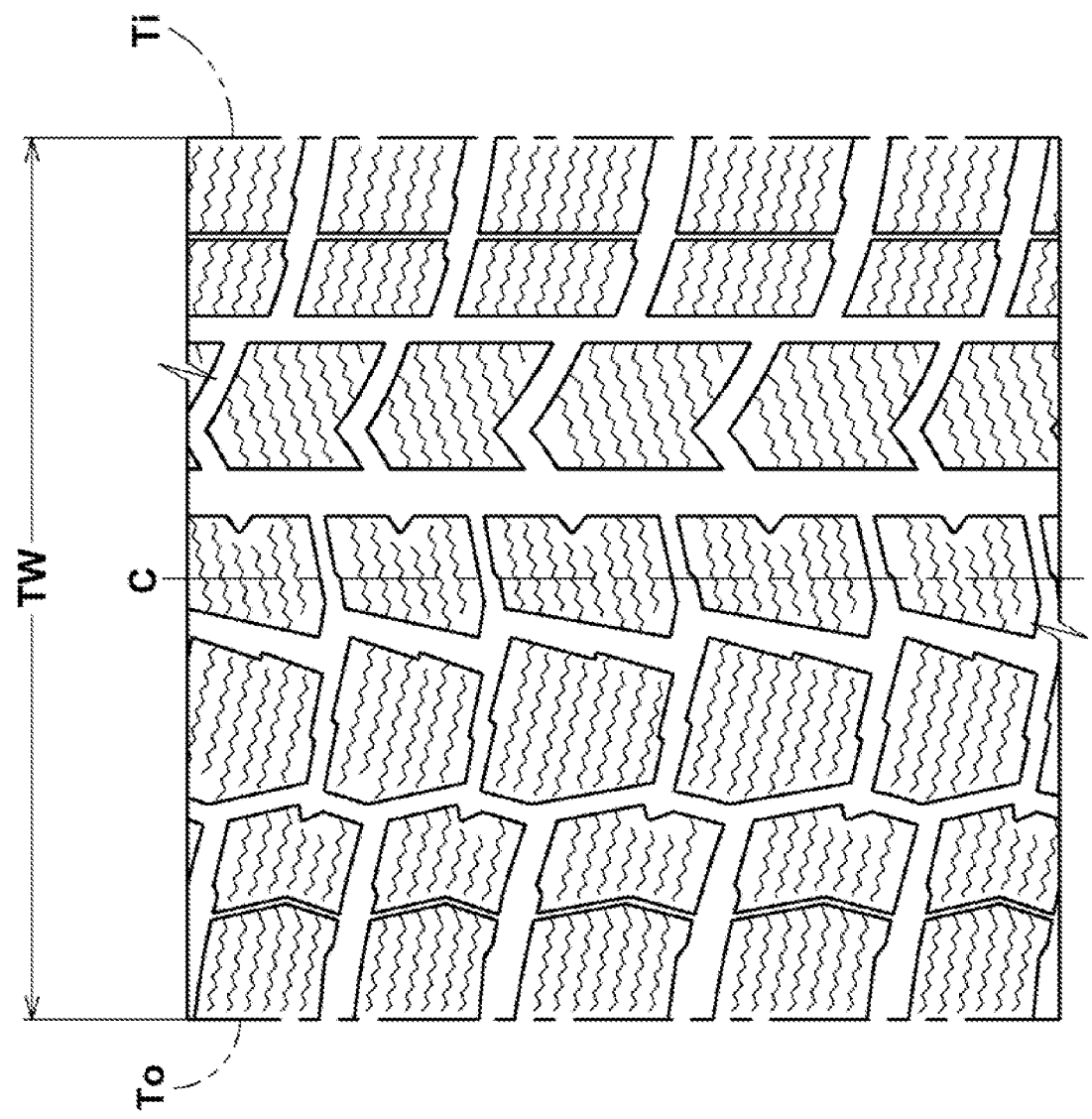
FIG. 7 is a developed partial plan view of a tire as comparative example 1 showing the tread portion.

Based on the tread pattern shown in FIG. 1, pneumatic tires of size 205/55R16 (rim size 16×7.0) for passenger cars were experimentally manufactured as test tires including working examples Ex.1-Ex.11 and comparative examples Ref.1 and Ref.2. The comparative example Ref.1 had a tread pattern shown in FIG. 7 which was similar to FIG. 1, but the axially inner parts 17 of the outboard lateral grooves 15 were omitted.

Figure 8:
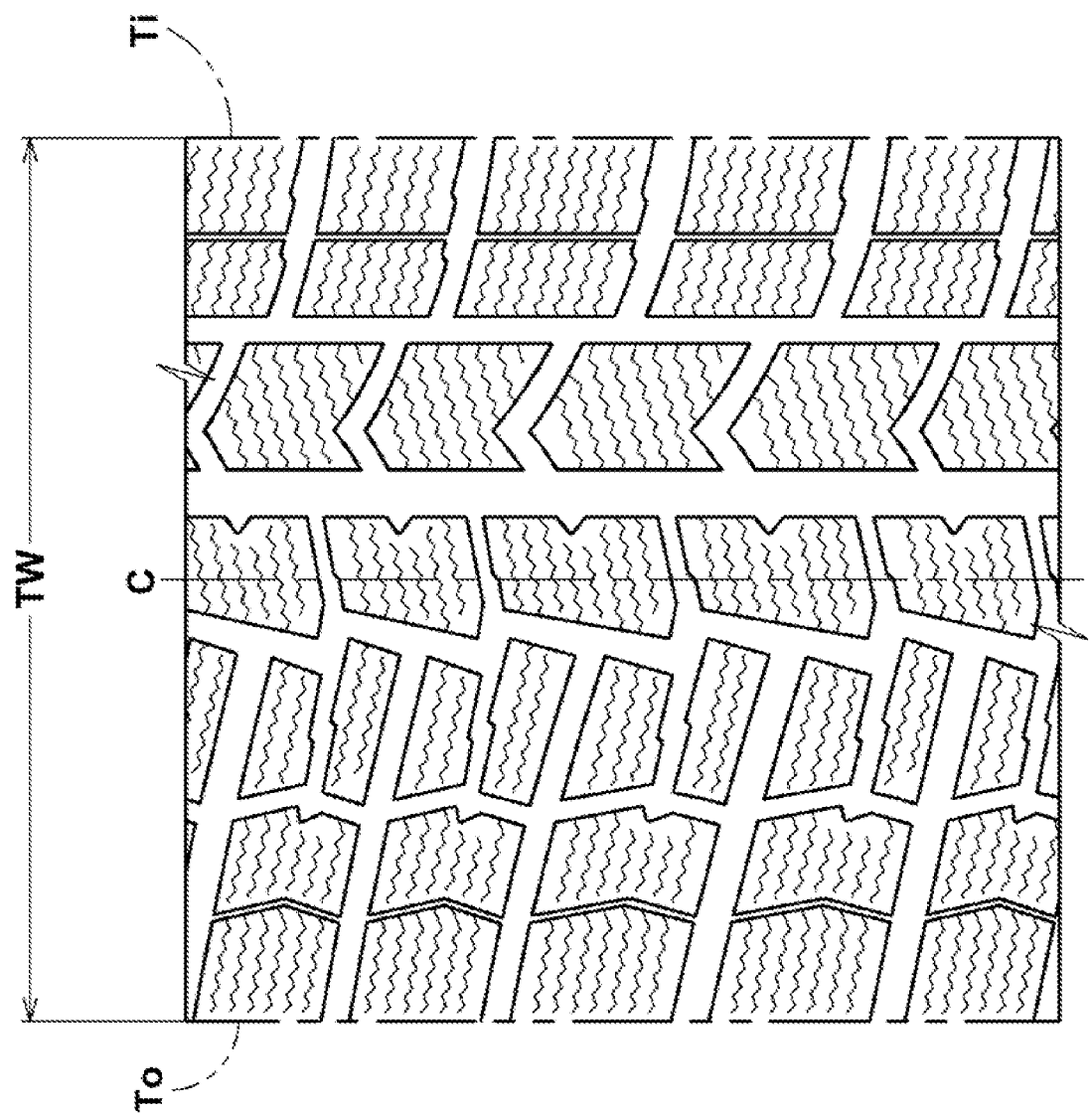
FIG. 8 is a developed partial plan view of a tire as comparative example 2 showing the tread portion.

The comparative example Ref.2 had a tread pattern shown in FIG. 8 which was similar to FIG. 1, but the outboard lateral grooves 15 were formed to have a constant groove width along the entire length.

Except for specifications shown in Table 1, the test tires had the same structure, wherein the tread width TW was 180 mm, all of the main grooves had the same groove depth of 9.5 mm, the length L2 of the axially inner parts 17 was 30.0 mm, and the maximum groove width w8 of the outboard lateral grooves 17 was 9.2 mm.

Using a test car (2000 cc rear-wheel-drive car provided on all wheels with test tires inflated to 210 kPa), the test tires were tested for on-snow performance and steering stability on dry roads as follows.

<On-Snow Performance>

Driving the test car on a snowy road, the test driver evaluated the on-snow performance based on the traction performance, braking performance and cornering performance. The results are indicated in Table 1 by an index based on comparative example Ref.1 being 100 wherein the larger the numeric value, the better the on-snow performance.

<Steering Stability on Dry Roads>

Driving the test car on a dry road, the test driver evaluated the steering stability.

The results are indicated in Table 1 by an index based on Comparative example Ref.1 being 100 wherein the larger the numeric value, the better the steering stability on dry roads.

TABLE 1

| Tire | Ref. 1 | Ref. 2 | Ex. 1 | Ex. 2 | Ex. 3 | Ex. 4 | Ex. 5 |
|---|---|---|---|---|---|---|---|
| Tread pattern (No. or Fig.) | 7 | 8 | 1 | 1 | 1 | 1 | 1 |
| Length L1/Tread width TW | — | 0.40 | 0.40 | 0.35 | 0.45 | 0.40 | 0.40 |
| Min. width W7/Max. width W8 | — | 1.00 | 0.23 | 0.23 | 0.23 | 0.10 | 0.20 |
| Length L3/Length L2 | 0.50 | 0.50 | 0.50 | 0.50 | 0.50 | 0.50 | 0.50 |
| On-snow performance | 100 | 103 | 108 | 106 | 108 | 106 | 108 |
| Steering stability on dry roads | 100 | 96 | 101 | 102 | 100 | 102 | 101 |

| Tire | Ex. 6 | Ex. 7 | Ex. 8 | Ex. 9 | Ex. 10 | Ex. 11 |
|---|---|---|---|---|---|---|
| Tread pattern (No. or Fig.) | 1 | 1 | 1 | 1 | 1 | 1 |
| Length L1/Tread width TW | 0.40 | 0.40 | 0.40 | 0.40 | 0.40 | 0.40 |
| Min. width W7/Max. width W8 | 0.30 | 0.50 | 0.23 | 0.23 | 0.23 | 0.23 |
| Length L3/Length L2 | 0.50 | 0.50 | 0.40 | 0.45 | 0.55 | 0.60 |
| On-snow performance | 108 | 109 | 108 | 108 | 107 | 106 |
| Steering stability on dry roads | 100 | 99 | 99 | 100 | 102 | 103 |

From the test results, it was confirmed that the tires according to the present invention were improved in the on-show performance without sacrificing the steering stability on dry roads.

REFERENCE SIGNS LIST 2 tread portion
3 outboard shoulder main groove
4 outboard crown main groove
15 outboard lateral grooves
To outboard tread edge
Ti inboard tread edge

The invention claimed is:

1. A tire comprising a tread portion having an outboard tread edge to be positioned away from a center of a vehicle body and an inboard tread edge to be positioned close to the center of the vehicle body, the tread portion provided with an outboard shoulder main groove extending continuously in the tire circumferential direction, an outboard crown main groove extending continuously in the tire circumferential direction and disposed between the outboard shoulder main groove and a tire equator, and a plurality of outboard lateral grooves extending from the outboard crown main groove to the outboard tread edge, wherein the groove width of each of the outboard lateral grooves is decreased toward the outboard crown main groove, wherein each of the outboard lateral grooves comprises an axially outer part extending from the outboard tread edge to the outboard shoulder main groove, and an axially inner part extending from the outboard shoulder main groove to the outboard crown main groove, the axially outer part is inclined with respect to the tire axial direction, and the axially inner part is inclined with respect to the tire axial direction in the same direction as the axially outer part.

2. The tire according to claim 1, wherein the difference between an angle of said axially outer part with respect to the tire axial direction and an angle of said axially inner part with respect to the tire axial direction is not more than 15 degrees.

3. The tire according to claim 1, wherein on both sides of the outboard shoulder main groove, the groove edges of said axially outer part are respectively aligned with the groove edges of said axially inner part.

4. A tire comprising a tread portion having an outboard tread edge to be positioned away from a center of a vehicle body and an inboard tread edge to be positioned close to the center of the vehicle body, the tread portion provided with an outboard shoulder main groove extending continuously in the tire circumferential direction, an outboard crown main groove extending continuously in the tire circumferential direction and disposed between the outboard shoulder main groove and a tire equator, and a plurality of outboard lateral grooves extending from the outboard crown main groove to the outboard tread edge, wherein the groove width of each of the outboard lateral grooves is decreased toward the outboard crown main groove, wherein each of the outboard lateral grooves comprises an axially outer part extending from the outboard tread edge to the outboard shoulder main groove, and an axially inner part extending from the outboard shoulder main groove to the outboard crown main groove, the axially outer part is inclined with respect to the tire axial direction, and the axially inner part is inclined with respect to the tire axial direction in the same direction as the axially outer part, wherein the groove edges of said axially inner part are each extended straight so that the groove width of the axially inner part is decreased continuously from the outboard shoulder main groove to the outboard crown main groove.

5. A tire comprising a tread portion having an outboard tread edge to be positioned away from a center of a vehicle body and an inboard tread edge to be positioned close to the center of the vehicle body, the tread portion provided with an outboard shoulder main groove extending continuously in the tire circumferential direction, an outboard crown main groove extending continuously in the tire circumferential direction and disposed between the outboard shoulder main groove and a tire equator, and a plurality of outboard lateral grooves extending from the outboard crown main groove to the outboard tread edge, wherein the groove width of each of the outboard lateral grooves is decreased toward the outboard crown main groove, wherein each of the outboard lateral grooves comprises an axially outer part extending from the outboard tread edge to the outboard shoulder main groove, and an axially inner part extending from the outboard shoulder main groove to the outboard crown main groove, the axially outer part is inclined with respect to the tire axial direction, and the axially inner part is inclined with respect to the tire axial direction in the same direction as the axially outer part, wherein said axially inner part comprises an axially outer deep portion having a depth $d1$ and an axially inner shallow portion having a depth $d2$ smaller than the depth $d1$.

6. The tire according to claim 1, wherein each of the groove edges of said axially outer part of said each of the outboard lateral grooves comprises an axially outer first edge segment extending from the outboard tread edge along the length direction of the axially outer part, an axially inner second edge segment extending to the outboard shoulder main groove along the length direction of the axially outer part, and an in-between third edge segment extending from the axially outer first edge segment to the axially inner second edge segment while inclining toward the widthwise center line of said axially outer part.

7. The tire according to claim 6, wherein the in-between third edge segments of the respective groove edges of said axially outer part are formed at different axial positions.

8. A tire comprising a tread portion having an outboard tread edge to be positioned away from a center of a vehicle body and an inboard tread edge to be positioned close to the center of the vehicle body, the tread portion provided with an outboard shoulder main groove extending continuously in the tire circumferential direction, an outboard crown main groove extending continuously in the tire circumferential direction and disposed between the outboard shoulder main groove and a tire equator, and a plurality of outboard lateral grooves extending from the outboard crown main groove to the outboard tread edge, wherein the groove width of each of the outboard lateral grooves is decreased toward the outboard crown main groove, wherein each of the outboard lateral grooves comprises an axially outer part extending from the outboard tread edge to the outboard shoulder main groove, and an axially inner part extending from the outboard shoulder main groove to the outboard crown main groove, the axially outer part is inclined with respect to the tire axial direction, and the axially inner part is inclined with respect to the tire axial direction in the same direction as the axially outer part, wherein the tread portion is further provided with an inboard shoulder main groove extending continuously in the tire circumferential direction, and an inboard crown main groove extending continuously in the tire circumferential direction and disposed between the inboard shoulder main groove and the tire equator, wherein the inboard shoulder main groove is a straight groove, and the inboard crown main groove is a straight groove, whereas the outboard shoulder main groove is a zigzag groove, and the outboard crown main groove is a zigzag groove, whereby, the tread portion is provided with a asymmetrical tread pattern.

9. The tire according to claim 8, wherein the tread portion is further provided with inboard lateral grooves each extending from the inboard shoulder main groove to the inboard crown main groove, and each bent in a V-shape.

10. The tire according to claim 9, wherein the tread portion is further provided with inboard shoulder lateral grooves each extending from the inboard shoulder main groove to the inboard tread edge.

11. The tire according to claim 10, wherein axially outer ends of the respective inboard middle lateral grooves and axially inner ends of the respective inboard shoulder lateral grooves are staggered on both sides of the inboard shoulder main groove.

12. The tire according to claim 1, wherein each of the outboard lateral grooves has a minimum groove width W7 and a maximum groove width W8, and the ratio W7/W8 thereof is in a range from 0.10 to 0.50.

13. The tire according to claim 5, wherein the deep portion has a groove depth d1, the shallow portion has a groove depth d2, and the groove depth d2 is in a range from 0.15 to 0.30 times the groove depth d1.

14. The tire according to claim 13, wherein an axial length L3 of the shallow portion is in a range from 0.40 to 0.60 times an axial length L2 of the axially inner part.

15. A tire comprising a tread portion having an outboard tread edge to be positioned away from a center of a vehicle body and an inboard tread edge to be positioned close to the center of the vehicle body, the tread portion provided with an outboard shoulder main groove extending continuously in the tire circumferential direction, an outboard crown main groove extending continuously in the tire circumferential direction and disposed between the outboard shoulder main groove and a tire equator, and a plurality of outboard lateral grooves extending from the outboard crown main groove to the outboard tread edge, wherein the groove width of each of the outboard lateral grooves is decreased toward the outboard crown main groove, wherein
each of the outboard lateral grooves comprises an axially outer part extending from the outboard tread edge to the outboard shoulder main groove, and an axially inner part extending from the outboard shoulder main groove to the outboard crown main groove,
the axially outer part is inclined with respect to the tire axial direction, and
the axially inner part is inclined with respect to the tire axial direction in the same direction as the axially outer part, wherein
an outboard middle land region defined between the outboard shoulder main groove and the outboard crown main groove is provided with outboard middle lateral grooves each positioned between every two of the circumferentially adjacent axially inner parts of the outboard lateral grooves, and
each of the outboard middle lateral grooves is bent in a stepped manner.

16. The tire according to claim 8, wherein an outboard shoulder land region defined between the outboard tread edge and the outboard shoulder main groove is provided with outboard shoulder narrow grooves which are bent in the same manner as the zigzag of the outboard shoulder main groove.

17. The tire according to claim 1, wherein
the outboard crown main groove is a zigzag groove made up of long segments and short segments which alternate in the tire circumferential direction, and
with respect to the tire circumferential direction, the long segments are inclined to one direction, and the short segments are inclined to one direction opposite to that of the long segments.

18. The tire according to claim 1, wherein
the outboard shoulder main groove is a zigzag groove and has axially outwardly projecting first projecting parts and axially inwardly projecting second projecting parts which alternate in the tire circumferential direction, and
the outboard lateral grooves extend across the respective first projecting parts of the outboard shoulder main groove.

19. The tire according to claim 18, wherein the outboard lateral grooves are connected to the respective long segments of the outboard crown main groove.

20. The tire according to claim 8 wherein the tread pattern is a block pattern consists of blocks each provided with a plurality zigzag sipes.

\* \* \* \* \*